United States Patent [19]

Moslener, deceased et al.

[11] 4,321,222

[45] Mar. 23, 1982

[54] METHOD OF MANUFACTURING PLASTIC-BONDED ANISOTROPIC PERMANENT MAGNETS

[75] Inventors: Manfred Moslener, deceased, late of Tangstedt, Fed. Rep. of Germany; by Gerhard A. Gentemann, administrator, Hamburg, Fed. Rep. of Germany

[73] Assignee: U.S. Philips Corporation, New York, N.Y.

[21] Appl. No.: 42,268

[22] Filed: May 24, 1979

[30] Foreign Application Priority Data

May 26, 1978 [DE] Fed. Rep. of Germany ....... 2823054

[51] Int. Cl.[3] ........ B29F 5/00

[52] U.S. Cl. ........ 264/24

[58] Field of Search ........ 264/24

[56] References Cited

U.S. PATENT DOCUMENTS

| | | | |
|---|---|---|---|
| 3,117,092 | 1/1964 | Parker | 252/62.5 |
| 3,564,654 | 2/1971 | Steingroever | 264/24 |
| 3,867,490 | 2/1975 | Gorling | 264/24 |
| 3,873,954 | 3/1975 | Baermann | 335/303 |
| 4,057,606 | 11/1977 | Kobayashi et al. | 264/24 |
| 4,063,970 | 12/1977 | Steingroever | 264/24 |

FOREIGN PATENT DOCUMENTS 1025671 4/1966 United Kingdom .

OTHER PUBLICATIONS

"The Handbook of Chemistry and Physics" (59th Ed., CRC Press, Inc. 1978) pp. B-151 & B-166.

*Primary Examiner*—Donald E. Czaja
*Assistant Examiner*—W. Thompson
*Attorney, Agent, or Firm*—Marc D. Schechter

[57] ABSTRACT

In a method of manufacturing plastic-bonded anisotropic permanent magnets, agglomerates having an easy axis of magnetization in a size from 300 to 1000 μm are used as a magnetic material in a mixture with single magnetic domain particles. In this manner a particularly large packing density of magnetic material in the permanent magnets is obtained. With a filling of the mixture of plastic-binder with magnetic material in the order of approximately 75% by volume, remanence values are realized above 310 mT.

7 Claims, 4 Drawing Figures

METHOD OF MANUFACTURING PLASTIC-BONDED ANISOTROPIC PERMANENT MAGNETS

BACKGROUND OF THE INVENTION

The invention relates to a method of manufacturing plastic-bonded, anisotropic permanent magnets in which semi-manufactured articles formed from permanent magnetic particles of oxide material and having an easy axis of magnetization are mixed with a plastic binder and are subjected to a molding process in a magnetic orienting field.

It is known to manufacture plastic-bonded, anisotropic permanent magnets (plastoferrites), for example, by mixing barium hexaferrite ($BaO.6Fe_2O_3$) or strontium hexa ferrite ($SrO.6Fe_2O_3$), in the form of a semi-manufactured article such as aniso tropic, sintered intermediate members having cross-sections of 1 to 2 cm$^2$ and lengths of 2–4 mm, with a plastic binder and subjecting the mixture to a molding process. The molding process may be, for example, an injection molding process in which the intermediate members are oriented by applying a magnetic field. A disadvantage of this method is that at comparatively high filling factors of magnetic material in plastic no optimum remanence values are obtained because the (coarse) intermediate members hinder each other when rotating under the influence of the magnetic field applied during the molding process.

However, when the filling factor of magnetic material in the plastic is chosen small enough such that the intermediate members can move freely, the filling factor becomes too small to enable the finished product to reach sufficient remanence values.

SUMMARY OF THE INVENTION

It is the object of the invention to provide a method of manufacturing permanent magnets in which, in addition to a particularly high filling factor of permanent magnetic material in plastic, an optimum alignment of (coarse) intermediate members is ensured.

According to the invention this object is achieved in that agglomerates having an average size of approximately 300 to 1000 μm are used for the semi-manufactured articles and are mixed with oxidic permanent magnetic single domain particles having an average size up to approximately 2 μm in a weight ratio of from 1:0.9 to 1:20.

When the semi-manufactured articles used are agglomerates having an average size in the range from 500 to 1000 μm and a substantially spherical grain shape, a high packing density of permanent magnetic material in plastic can be achieved in which the agglomerates having an easy axis can easily orient themselves after applying a magnetic orienting field without impeding each other.

When the semi-manufactured articles used are agglomerates formed from permanent magnetic oxide powder mixed with plastic under the action of a magnetic orienting field, the resulting permanent magnetic have a particularly high rigidity. This may be ascribed to an intimate bonding of the agglomerates in the plastic binder of the permanent magnet, which presumably is not only of a mechanical nature but also of a chemical nature.

Preferably between 4.5 and 10% by weight of plastic binder is mixed with at most 55% by weight of agglomerates. The remainder of the mixture is permanent magnetic single domain particles. The advantage of this is that a particularly large packing density (filling factor) of magnetic material in the plastic binder and hence particularly favorable remanence values can be obtained because the small anisotropic single domain particles fit in the intermediate spaces between the agglomerates having an easy axis. In this manner an optimum alignment of all particles in the magnetic orienting field can be obtained.

With a grain distribution as mentioned above, optimally aligned permanent magnets having remanence values above 310 mT are obtained by filling the plastic binder mixture with magnetic material on the order of approximately 75% by volume.

An embodiment of the invention will now be described in greater detail with reference to the drawing.

DESCRIPTION OF THE PREFERRED EMBODIMENTS

Figure 1A:
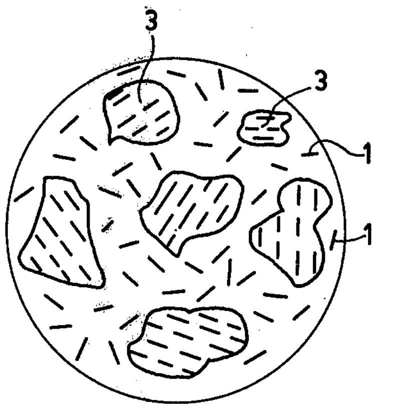
FIGS. 1*a* and 1*b* shows diagrammatically the structure of a plastic-bonded permanent magnet manufactured by means of the method according to the invention.
Figure 1B:
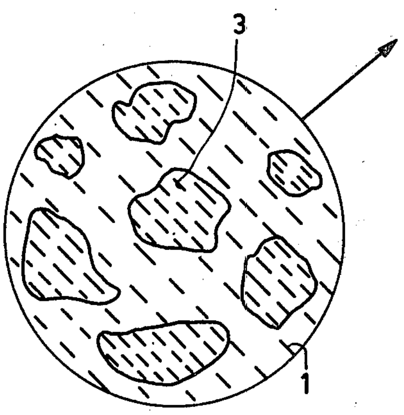

FIGS. 1*a* and 1*b* show diagrammatically the structure of a permanent magnet manufactured according to the invention while using fine anisotropic permanent magnetic single domain particles 1 and larger permanent magnetic irregularly fractured agglomerates 3 having an easy axis of magnetization. FIG. 1*a* shows anisotropic small single domain particles 1 and the agglomerates 3 having an easy axis in a non-oriented condition, FIG. 1*b* shows these particles in the aligned condition after applying a magnetic orienting field. The agglomerates 3 float as if in a sea of small anisotropic single domain particles 1 and can be aligned without impeding each other. As a result of the grain distribution of the magnetic material a high overall filling density of magnetic material in the mixture of plastic-binder is achieved.

Figure 2A:
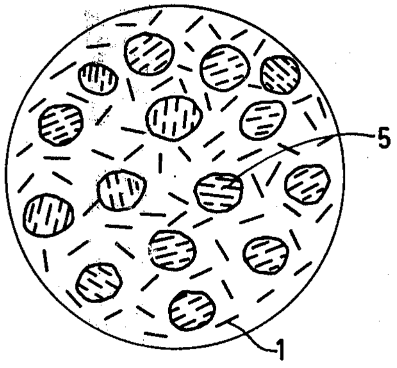
FIGS. 2*a* and 2*b* shows diagrammatically the structure of a similar plastic-bonded permanent magnet in the manufacture of which, however, agglomerates having approximately spherical grain shape are used.
Figure 2B:
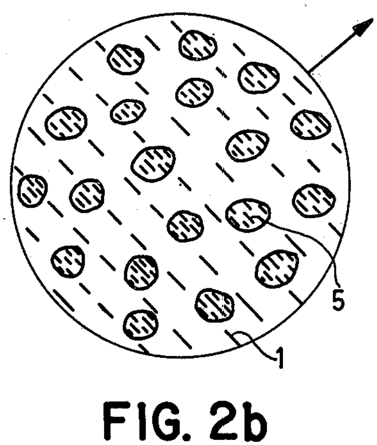

This ratio becomes even more favorable in permanent magnets having the grain structure shown in FIGS. 2*a* and 2*b*. The agglomerates 5, already having an easy axis of magnetization are nearly spherical. In this manner an even larger filling factor of magnetic material in the plastic-binder mixture than with the irregularly fractured agglomerates shown in FIGS. 1*a* and 1*b* can be obtained.

The agglomerates 3 and 5 can be manufactured by taking a material having an easy axis of magnetization, for example waste material of other molding processes for making permanent magnets, and reducing it to the desired grain size. Alternatively, larger workpieces, having an easy axis of magnetization, can be manufactured in a separate step and then be fragmented.

The starting material may then be fractured coarsely, grains having a size of approximately 300 μm to approximately 1000 μm being sieved for further processing (see FIGS. 1*a* and 1*b*).

Alternatively, however, the starting material may be ground to grains having a substantially spherical shape or may be manufactured directly to a spherical grain shape, a fraction having dimensions of approximately 300 to approximately 1000 μm being sieved for further processing (see FIGS. 1*a* and 1*b*).

An an example of the invention, the table below states various mixtures of masses for plastic-bonded permanent magnets and the magnetic properties thereof.

| | | I | II | III | IV |
|---|---|---|---|---|---|
| agglomerates having an easy axis of magnetization | (Wt. %) | 50.0 | 42.48 | 5.0 | — |
| single domain particles | (WT. %) | 45.2 | 51.92 | 85.5 | 90% |
| binder mixture of plastic lubricant + stabilizers | (Wt. %) | 4.8 | 5.6 | 9.5 | 10% |
| remanence $B_r$ | (mT) | 318 | 314 | 272 | 263 |
| density $\gamma$ | (g/cm$^3$) | 4.11 | 4.07 | 3.6 | 3.55 |
| coercive field strength $_BH_c$. | (kA/m) | 270 | 270 | 270 | 270 |

From the table it follows that in the permanent magnet manufactured according to the invention the remanence increases with the share of agglomerates having an easy axis of magnetization, while the coercive field strength remains constant.

In the manufacture of permanent magnets from the masses I, II and III, recorded in the table, first the plastic, for example polypropylene, is transformed to the plastic state via a thermal treatment and pressure treatment. To this plastic mass are then added the further constituents such as agglomerates, for example, barium hexaferrite or strontium hexaferrite grains, the single domain particles, for example barium hexaferrite or strontium hexaferrite powder, lubricant, for example dioctylphthalate, and heat stabilizers, for example β,β'-thio-di(propionic acid lauryl ester). The mass is then mixed until a homogeneous distribution of all constituents is reached. The mixture is then supplied to a molding device, for example an extrusion press, in which the mass is compressed to form thin strings of approximately 4 mm diameter. This extruded material is granulated and is the starting material for a subsequent molding process, for example an injection molding process, in which the ultimate workpieces are manufactured at a temperature of ~230° C. dependent on the plastic used. The magnetic particles are oriented and the magnetic material is magnetized during the molding of the workpiece. If necessary, a post-magnetization of the workpiece may also be performed.

Within the scope of the method of the invention, not only can extrusion or injection molding be used successfully in shaping, but deformation and molding methods for processing powdered masses may also be used successfully in which the workpieces after molding are heated, for example, by hot-pressing methods.

What is claimed is:

1. A method of manufacturing plastic-bonded anisotropic permanent magnets comprising the steps of:

transforming a plastic binder into a plastic state;

admixing, with the plastic binder, agglomerates of permanent magnetic oxide material having an easy axis of magnetization;

admixing, with the plastic binder, single magnetic domain particles of permanent magnetic oxide material;

applying a magnetic field to the mixture so as to orient the magnetic domains in the agglomerates and the single magnetic domain particles in a substantially uniform direction; and;

molding the mixture into a desired form;

characterized in that the agglomerates have an average size of from 300–1,000 microns, the single magnetic domain particles have an average size up to approximately 2 microns, and the weight ratio of agglomerates to single domain particles is from 1:09 to 1:20.

2. A method as claimed in claim 1, wherein the step of molding comprises the steps of:

extrusion molding the mixture to form thin strings;

granulating the thin strings; and injection molding the granulated thin strings into the form of the ultimate magnet.

3. A method as claimed in claim 1, wherein the agglomerates are formed by mixing a permanent magnetic oxide powder with a plastic binder and subjecting the mixture to a molding process in magnetic orienting field.

4. A method as claimed in claim 1, wherein the agglomerates are formed by compacting a permanent magnetic oxide powder in a mold in a magnetic orienting field and sintering it.

5. A method as claimed in claim 1 wherein the agglomerates have an average grain size from 500 to 1000 μm and an approximately spherical shape.

6. A method as claimed in claim 1, wherein between 4.5 and 10% by weight of plastic binder is mixed with at most 55% by weight of agglomerates, the remainder of the mixture being permanent magnetic single domain particles.

7. A method as claimed in claim 3, 4 or 5, wherein barium and/or strontium hexaferrite is used as a permanent magnetic oxide material.

* * * * *